United States Patent [19]

Stegmeier

[11] 4,331,734

[45] May 25, 1982

[54] SIMULATED VOLCANIC ROCK

[76] Inventor: William J. Stegmeier, 2525 E. Prince Rd., Apt. 72, Tucson, Ariz. 85716

[21] Appl. No.: 202,818

[22] Filed: Oct. 31, 1980

[51] Int. Cl.$^3$ .................... B32B 13/02; B05D 7/00; B05D 3/10

[52] U.S. Cl. ............................ 428/403; 106/97; 427/221; 427/273; 427/352; 427/336; 428/404

[58] Field of Search ............... 427/221, 353, 273, 277, 427/352, 336; 428/403, 404; 106/97

[56] References Cited

U.S. PATENT DOCUMENTS

| | | | |
|---|---|---|---|
| 2,644,772 | 7/1953 | Kaye | 427/221 |
| 2,806,256 | 9/1957 | Smith-Johannson | 427/352 X |
| 3,020,597 | 2/1962 | Smith-Johannson | 427/352 X |
| 4,256,501 | 3/1981 | Banino | 427/221 X |

*Primary Examiner*—Michael R. Lusignan
*Attorney, Agent, or Firm*—C. Michael Zimmerman

[57] ABSTRACT

A simulated volcanic rock is described, as well as a method for producing the same. The rock includes a central core encased within a concrete coating formed from a plaster which includes an aggregate of expanded polymer particles. During production of the rock, the polymer particles at the exterior surface of the coating are exposed and subsequently dissolved to leave such exterior surface with pocks simulating the gas-formed voids typically present on the surface of natural volcanic rock.

19 Claims, No Drawings

SIMULATED VOLCANIC ROCK

BACKGROUND OF THE PRESENT INVENTION

The present invention relates to simulated rock and a method of producing a product simulating natural volcanic rock in appearance.

Rocks are often used in landscaping for aesthetic background. Volcanic rock, i.e., rock resulting from volcanic action and typically having open pocks or voids on its surface formed by gases, is one of the most attractive for this purpose. However, volcanic rock is relatively expensive in many locations in view of its local scarcity, demand, the cost of transporting the same from a distant location, etc. Because of this expense, efforts have been made in the past to simulate volcanic and other rocks, but with concrete. These efforts have been largely unsuccessful, though, in view of the difficulty of simulating with concrete many of the features naturally found in such a rock. That is, "concrete" rocks typically have been easily discernable from the real thing, and for this reason are not acceptable to many consumers.

SUMMARY OF THE INVENTION

The present invention provides a method of producing a simulated volcanic rock which results in a product quite similar in appearance to that of natural volcanic rock. It comprises the steps of providing a core having a shape generally conforming to the contour desired for the simulated rock, and applying to the core a coating of a concrete plaster. As a particularly salient feature of the invention, the concrete plaster includes an aggregate of polymer particles. Most desirably, such particles are particles of an expanded polymer. After the coating is applied to the core, the expanded polymer particles in the same at its surface are exposed and then dissolved, leaving the exterior surface of the coating with pocks which simulate the gas-formed voids typically present on the surface of natural volcanic rock.

The aggregate particles of an expanded polymer can be produced in any convenient way. For example, expandable beads of expandable polymers, such as polystyrene, are available for use in molding rigid foam plastic objects and parts. An example is the polystyrene beads sold under the trademark "STYROPOR" by BASF Corporation. Particles of an expanded polymer are also available for packing purposes. An aggregate of particles of an expanded polymer can also be produced by crumbling objects made from an expanded polymer. Suitable particles also often result from the shaping of various objects from blocks of an expanded polymer material. In order to provide pocks in the surface having various dimensions, particles distributed in size in the range between about ⅛" and ½" in diameter are preferred.

The use of an aggregate of particles of an expanded polymer has other advantages. For one, such an aggregate is significantly less dense than silica or rock pebbles, with the result the settable concrete plaster applied to the core is relatively light. Sagging of the same before full curing is thus minimized.

Most desirably, the core itself is compressible to accept contraction of the settable concrete plaster coating due to thermal variations and shrinkage during curing. Cracks and the like are thus avoided. In this connection, particles of an expanded polymer are themselves elastically compressible to accept contraction and expansion internally within the coating to minimize cracking.

The method of the invention includes other steps and features which most desirably are included to optimize the same. And the invention includes a simulated rock product made from a core having a shape as described, and a concrete surface coating which is formed from an intermixture of hydraulic cement and a polymer particle aggregate having a significantly lower density than silica or rock pebbles normally used as aggregate. Such a product is significantly less heavy than a conventional concrete product of this nature and, as mentioned previously, the use of such a low density aggregate reduces the tendency of the coating to sag during curing.

The invention includes other features and advantages which will be described or will become apparent from the following more detailed description of preferred embodiments.

DETAILED DESCRIPTION OF PREFERRED EMBODIMENTS

The method of the invention is applicable to the formation of simulated rocks or boulders of substantially any size. It enables such rocks or boulders to be formed at an off-site location or directly in-place. Very generally, simulated rock made according to the invention includes a central core having an exterior concrete coating designed to provide the desired surface appearance.

It is desirable that the core of a simulated rock or boulder which will be moved or transported, be of a relatively light material. Moreover, the core should be capable of being shaped or otherwise formed with a contour generally conforming to that desired for the simulated rock. The core also most desirably is capable of elastically accepting contractions or expansions due to thermal variations or the setting of the exterior coating.

A block of rigid foam plastic material, such as of expanded polystyrene, is quite suitable for forming the core of a simulated rock desired to be lightweight and/or transportable. Such a material easily can be shaped via cutting or the like, to the contour desired for the rock. And such a material typically is elastically contractible to some degree to take up dimensional changes in the concrete exterior coating caused by thermal variations or the curing of such coating. When such a material is to form the core, the block is cut to the approximate size and contour of the desired rock. It is actually cut to a size somewhat smaller than the desired size for the rock, to accept, for example, a surface coating of a 2" depth.

If the simulated rock is to be a large boulder formed in-place, the majority of the core can be formed by mounding soil at the location desired for the boulder. The mound is then most desirably covered with a layer of a material which will provide elasticity and can provide the desired contour. It has been found that such layer can be suitably and simply provided by a mixture of particles of an expanded polymer with a hydraulic cement or other material which will bind the same together. Expanded polystyrene beads or particles of the type normally furnished for packing is quite suitable for this purpose. They should be mixed with a minimum of hydraulic cement (a 10 to 1 mixture) or other binder, to assure that the layer will retain its shape once it is set. Once the core itself is formed, it is wrapped relatively tightly with small aperture wire mesh or some other suitable concrete reinforcement construction. The purpose of the same is to reinforce the coating which is subsequently applied, and thus inhibit its cracking, as well as hold the same to the core during curing. Such wire mesh or reinforcement construction is crushed or otherwise made to follow the contours of the core relatively closely. Moreover, it is most desirably placed into contact with such core to interact with depressions or the like on the core and provide a mechanical bond between the core and the coating which will subsequently be applied. Wire mesh having one-inch openings has been found quite suitable for use with the concrete plaster mixture to be particularly described below.

The settable concrete plaster for the coating most desirably is one which, once applied to the core, will set sufficiently to become self-supporting relatively rapidly. Moreover, it is one which is lightweight, and includes appropriate pigmentation as will be discussed below, to simulate rock color. It is made from a hydraulic cement, such as Portland cement. A plaster of this nature typically includes in addition to the cement, an aggregate of sand (silica), gravel, or crushed rock. When mixed with water, the cement and aggregate harden into concrete via relatively complex chemical and mechanical actions.

As a particularly salient feature of the instant invention, the aggregate with which the hydraulic cement is mixed is made up of particles of an expanded polymer. There are several reasons for this substitution. The most important is that, as will be described below, such an aggregate can be dissolved after the coating is applied to the core to produce pocks at the coating surface which will simulate the gas-formed voids typically present on the surface of natural volcanic rock. Another advantage of using an aggregate of expanded polymer particles is to reduce the likelihood of the coating cracking during curing or because of thermal variations. In this connection, such particles are elastically compressible so as to be capable of contracting or expanding in size, to accommodate internal concrete shrinkage or expansion.

The use of polymer particles as the plaster aggregate results in the concrete coating being quite lightweight, compared to a coating of concrete having a typical aggregate, e.g., sand and/or gravel. The density of most polymers (expanded and unexpanded) is significantly less than the density of silica (2.2–2.6 grams per ml). For example, the density of the unexpanded polystyrene beads sold by BASF Corporation under the trademark STYROPOR for the formation of expanded polystyrene objects, is approximately 65 lbs. per cu.ft. (1040 kg/cu.m.). And expanded polymer particles are even less dense. It is preferred for purposes of the instant invention, that the density of the polymer particles utilized as an aggregate be less than about ten times the density of silica. Obviously, this lightweightness results in the finished boulder having a significantly lower weight than a natural rock. When a rigid foam plastic core is utilized as is preferred for simulated rocks intended to be portable, the light-weightness of the coating due to an expanded polymer aggregate, combines with the lightweightness of the core, to provide a total product which is quite lightweight. Thus a boulder which if natural would weigh a ton, may weigh as little as 200 lbs., when provided as a simulated rock in accordance with the invention.

The lightweightness associated with a polymer aggregate is also quite important during the formation of the rock. That is, before the plaster coating has cured, there is little or no sagging (flow) of the coating due to gravitational forces, even when the full depth of the coating is applied at one time as will be described.

It will be appreciated from the above that the use of an exterior concrete coating having a polymer aggregate in the formation of simulated rocks, has advantages irrespective of whether or not the simulated rock is designed to simulate volcanic rock. That is, irrespective of whether or not pocks or voids are desired to be formed, the utilization of polymer aggregate in the concrete coating of a simulated rock makes a product which is lightweight. And if the particles are of expanded polymer, e.g., particles of rigid foam plastic capable of elastically compressing, their use reduces the tendency for surface coating cracking.

It will also be appreciated that although it is preferred that a polymer aggregate be the only aggregate present in the concrete used for the core coating, other aggregate materials can be used in combination with the polymer aggregate. However, to the extent standard aggregates are used, the advantages associated with use of a polymer aggregate often will be reduced.

While in general, particles of all synthetic plastic resins not inconsistent with the action responsible for concrete curing will provide many of the advantages of the invention, it is preferred that the particles be of an expanded polymer, such as expanded polystyrene. Expanded polymer particles generally are much easier to dissolve than particles of an unexpanded polymer. Moreover, they are significantly lighter in weight and are elastically compressible to accept contraction and expansion of the coating. And for reasons which will become more apparent below, it is preferred that the aggregate particles be of various sizes, in the range between about $\frac{1}{8}''$ and $\frac{1}{2}''$ in diameter.

The percentage in the mixture of polymer aggregate to cement can vary, depending upon the particular aggregate and cement utilized. In general, it is desirable for both lightweightness and for proper simulation of the voids in a volcanic rock, that the aggregate make up about $\frac{1}{2}$ by volume of the dry mixture from which the plaster for the concrete coating is made.

It is also preferred that the expanded polymer be of the closed cell type, or that the individual particles otherwise provide closed surfaces to the cement. This will aid in maintaining a clear separation between such polymer particles and the cement, for the subsequent formation of voids by dissolving the particles as discussed below.

Most desirably, the dry plaster mixture includes constituents in addition to cement and the polymer aggregate. For one, it preferably includes a calcining agent, such as calcium chloride powder, to accelerate curing and provide early strength to the coating before significant moisture loss. Such early strength will aid in reducing sagging after the plaster has been applied to the core, as well as enable curing of the type discussed below at an early time.

The amount and type of calcining agent added to the dry plaster mixture will depend on the particular cement, aggregate and other ingredients. In this connection, calcining agents are commonly used as an addition to a dry plaster mixture. In the preferred embodiment, calcium chloride is added to the preferred mixture to be about $1\frac{1}{2}$ to 2 percentage by volume of Portland cement.

The dry plaster mixture should also include color pigmentation as necessary to provide the desired rock color. It has been found that the brown-reddish color often exhibited by volcanic rock essentially can be duplicated by adding to the dry mixture, approximately 3 lbs. of chocolate brown iron oxide pigmentation and 1 lb. of red iron oxide pigmentation, for each 94-lb. bag of cement. Realistic charcoal coloration can be achieved by using as pigmentation 3 lbs. of black iron oxide and 1 lb. of red.

It is preferred that the plaster mixture also include a wetting agent which will enable reduction in the water content needed for the coating to set once it has been applied to the core. Most desirably, the wetting agent is a so-called "super" wetting agent especially formulated for concrete. An example of such a wetting agent is the liquid product sold under the trademark LOMAR-D. The reduction of water content helps to eliminate cracks in the final concrete coating due to shrinking during curing. Again, the amount of wetting agent added to the mixture will depend on the particular cement and other materials used. In the preferred embodiment in which LOMAR-D wetting agent is used, the addition of about 5 liquid ounces for every 94-lb. bag of cement has been found to be quite satisfactory.

The plaster mixture for the concrete coating is then completed by the addition of water to form an appropriate plaster slurry. As mentioned previously, use of a wetting agent reduces the amount of water which must be added to achieve appropriate curing. When the wetting agent is the LOMAR-D brand added in the proportions mentioned above, only about 3½ gallons of water need be added for approximately each 101 lbs. of dry mixture. In other words, the use of the wetting agent reduces the need for water by about 25%.

Once the water is well mixed with the dry material, the plaster is ready to be applied to the exterior surface of the core. The core is first completely covered by a continuous coating. Because of the lightweight aggregate, the plaster can be applied to a depth of 2" without concern of significant sagging. The likelihood of sagging is further reduced by the use of a wetting agent to consequently reduce the amount of water (and its weight) needed for curing.

After the initial coating, additional plaster is added at various locations to provide the simulated rock with the ledges, bumps, etc., typically found with normal rock. The plaster will begin setting into concrete. Because of the use of a calcining agent as discussed above, it will set to a generally self-supporting state in only about 20–30 minutes. It is then, most desirably, tooled with a margin trowel. Indentures, crevices and ledges are cut into the surface, simulating the fractures and the like found in natural volcanic rock, such as is quarried.

Once the workers producing the rock are satisfied with the appearance of the general contour of the exterior, the expanded polymer particles in the plaster at the outer surface of the coating are exposed. The purpose of exposing the particles is to make them available for subsequent removal (by dissolving) to leave the surface with pocks or voids. When the polymer particle aggregate makes up about one-half of the dry cement mixture, at least about 50% of those particles at the surface should be exposed. They can be exposed simply by use of a wet paint brush or water spray nozzle. As the exterior surface of the coating is being brushed or sprayed to expose the polymer particles, protrusions and other loose particles on the surface which may well flake off when the simulated rock is handled or moved, are also most desirably knocked from the surface.

After the polymer particles at the coating surface are exposed, they are dissolved to leave the surface with pocks. This simply can be accomplished by treating the surface of the rock coating with a solvent that will attack the polymer particles but will not otherwise affect the surface detrimentally. Numerous solvents meet this criteria and are suitable for use with the invention. The solvent 1,1,1-trichloroethane is quite suitable for dissolving exposed polymer aggregate made up of expanded polystyrene beads.

The solvent can be applied to the simulated rock in any desired manner, such as by spraying. In this connection, it may take more than one application of the solvent to the rock to assure that essentially all of the polymer material is dissolved. For example, when the particles are expanded polystyrene and the solvent is 1,1,1-tricholorethane, the solvent is first sprayed on the rock to provide an even coating. Substantially all of the polystyrene will be dissolved with such first treatment. However, a second spraying typically is applied after five or ten minutes, to assure removal of essentially all polystyrene.

It should be noted that the amount of solvent required is somewhat dependent upon the density of the expanded polymer particles to be dissolved. The denser the particle, the more solvent which is required. This is one more reason why low density expanded particles are preferred.

The rock typically now is flushed with water via, for example, spraying, in order to flush away both the solvent and the dissolved polymer. After removal of the polymer material, the surface of the simulated rock will have numerous voids. In many instances, however, such voids will be reentrant, i.e., because of the shape of the polymer particle which was dissolved, the exterior opening of the void will be of less cross-sectional area than at an interior void location. For example, if a particle is spherical and only a small portion of the same is exposed at the concrete surface, the void remaining after it has been dissolved may be spherical in nature, but only have a small opening at the surface.

Most desirably, the partially closed voids are opened to their full interior diameter by, for example, using a stippling brush on the surface to break down the void side walls. And the full surface of the coating should be stippled so as to texture the same, prior to the setting of the concrete plaster. It has been found that such surface stippling and the void wall breakdown can be accomplished with a nylon brush having heavy (0.03" in diameter) six-inch long bristles.

The resulting simulated rock will have the desired volcanic appearance. The surface brushing to expose the expanded polymer particles, the dissolving of the same, and the subsequent stippling, eliminate any artificial appearance associated with the trowel and knife marks made earlier.

A moisture sealant is thereafter applied to the coating to retain moisture within the same during its full setting period. Various sealants are typically provided for curing concrete, and there are no special criteria in connection with selection of the same for the instant invention, except that it should be one capable of penetrating into the coating for a significant distance (for example, 1½ inches). The water sealant Hydro-Therm sold by Solar Seal International, Maitland, FL, has been used successfully and is quite suitable for this purpose.

The use of a water sealant is especially desirable in connection with a concrete layer applied to a core to simulate a rock surface, since it enhances the ultimate strength of such a layer which typically will be thinner than most concrete masses. That is, it retains moisture in the layer during the full curing period. Moreover, it prevents the calcining agent and impurities from migrating to the surface of the coating and detrimentally interfering with the surface coloring.

The simulated volcanic rock of the invention is now completed. Once the concrete coating has cured for about a week, the rock can be moved or transported without undue concern about surface damage.

Although the invention has been described in detail in connection with preferred embodiments, it will be appreciated by those skilled in the art that various changes and modifications can be made without departing from its spirit. It is therefore intended that the coverage afforded applicant be limited only by the claims and their equivalent language.

I claim:

1. A method of producing a simulated rock comprising the steps of:
   A. providing a core having a shape generally conforming to the contour desired for said simulated rock:
   B. mixing a hydraulic cement with an aggregate of particles of an expanded polymer of various sizes in the range between about ⅛ and ½ inches, to form a settable concrete plaster;
   C. applying said plaster to said exterior surface of said core to form a coating thereon;
   D. exposing prior to the setting of said concrete plaster, polymer particles in said plaster at the exterior surface of said coating; and
   E. dissolving said exposed polymer particles to leave the exterior surface of said coating with pocks, simulating the gas-formed voids typically present on the surface of natural volcanic rock.

2. A method according to claim 1 wherein said expanded polymer particles are elastically compressible.

3. A method according to either claim 1 or claim 2 wherein said expanded polymer particles are formed from polystyrene.

4. A method according to either claim 1 or claim 2 further including the step after said exposed polymer particles are dissolved, of breaking down the side walls of pocks having a greater internal dimension than a corresponding dimension of its opening onto said coating exterior surface.

5. A simulated volcanic rock made by a process including the steps of either claim 1 or claim 2.

6. A method according to either claim 1 or claim 2 further including the step of stippling said exterior surface of said coating prior to the setting of said concrete plaster.

7. A method according to claim 6 further including the step of troweling said coating prior to said step of stippling, to form indentations in the exterior surface thereof simulating the crevices and ledges typically present on the surface of natural volcanic rock.

8. A method according to claim 1 further including the step of wrapping said core with reinforcing wire mesh for said plastic prior to the application of said plaster to the exterior surface thereof.

9. A method according to claim 8 wherein said step of providing said core is further limited by providing such a core which is generally compressible to accept any contraction of said coating due to thermal variations or its setting.

10. A method according to either claim 1 or claim 9 wherein said step of mixing said hydraulic cement with an aggregate, includes mixing said hydraulic cement and said aggregate of expanded polymer particles with a wetting agent which will enable reduction in the water content needed for the coating to set.

11. A method according to claim 10 wherein said step of mixing said hydraulic cement with an aggregate and a wetting agent, includes mixing therewith a calcining agent to accelerate the period of time required for said coating to set.

12. A method according to claim 10 further including the step of applying a moisture sealant to said coating after said exposed particles are dissolved to retain moisture therewithin during the setting of said coating.

13. A product which simulates natural rock comprising:
    a core having a shape generally conforming to the contour desired for said simulated rock; and
    a concrete surface coating formed from a mixture of hydraulic cement and an aggregate, a substantial portion of which is provided by polymer particles having a significantly lower density than silica.

14. A simulated rock product according to claim 13 wherein said polymer particles forming a substantial portion of said aggregate are particles of expanded polymer.

15. A simulated rock product according to claim 13 wherein said concrete surface coating has a plurality of pocks on its exterior surface, simulating the gas-formed voids typically present on the surface of natural volcanic rock.

16. A simulated rock product according to claim 13 wherein the density of the individual polymer particles is less than ten times the density of silica.

17. A simulated rock product according to claim 13, claim 14, claim 15, or claim 16 wherein said core is compressible to accept any contraction of said coating due to thermal variations or its setting.

18. A simulated rock product according to claim 13, claim 15, or claim 16 wherein the particles of said polymer forming said aggregate are elastically compressible to accept contraction and expansion of said concrete coating during thermal variations or its setting.

19. A simulated rock product according to claim 18 wherein said polymer particles are formed from polystyrene.

* * * * *